United States Patent [19]

Liu

[11] Patent Number: 5,893,339
[45] Date of Patent: Apr. 13, 1999

[54] DOG HARNESS

[76] Inventor: Chun Chien Liu, 4, Chungchu Hsiang, Chungkou Tsun Huatang Hsiang Changhua Hsien, Taiwan

[21] Appl. No.: 09/030,735

[22] Filed: Feb. 25, 1998

[51] Int. Cl.[6] .................................................. A01K 27/00
[52] U.S. Cl. ...................... 119/792; 119/793; 119/856; 119/770; 119/857
[58] Field of Search ............................ 119/792, 856, 119/770, 793, 857; 24/3, 712

[56] References Cited

U.S. PATENT DOCUMENTS

| 5,325,819 | 7/1994 | Krauss | 119/792 |
|---|---|---|---|
| 5,383,426 | 1/1995 | Krauss | 119/793 |
| 5,427,061 | 6/1995 | McCullough | 119/771 |
| 5,503,113 | 4/1996 | Knight | 119/856 |
| 5,611,118 | 3/1997 | Bibbee | 24/298 |
| 5,743,216 | 4/1998 | Holt, Jr. | 119/793 |

*Primary Examiner*—Michael J. Carone
*Assistant Examiner*—Judith A. Nelson
*Attorney, Agent, or Firm*—Pro-Techtor International Services

[57] ABSTRACT

A dog harness having a collar mounted on a dog's neck, a girth passing around the dog's body, the girth having a first end fastened to the metal ring at the collar and a second end passing around the dog's body and then inserted through the metal ring at the collar, a retainer moved on the girth between the second end of the girth and the metal ring at the collar and secured at the desired location, a drag rope connected to the second end of the girth, and a belt connected between the collar and the girth and retained between the two front legs of the dog.

3 Claims, 6 Drawing Sheets

DOG HARNESS

BACKGROUND OF THE INVENTION

The present invention relates to a dog harness, and more particularly to such a dog harness which is helpful to walk the dog.

When growing a dog, one may have to spend a certain length of time in walking the dog daily. Before walking the dog, a collar must be mounted on the dog's neck so that a drag rope can be fastened to the dog for controlling the walking of the dog. Various collars have been disclosed for this purpose. FIG. 1 shows a collar 5 which is equipped with a quick-release hook 52 and a length adjustment frame 51. FIG. 2 shows another structure of collar 6 which is equipped with a buckle comprised of a frame 61 and a prong 62. FIG. 3 shows still another structure of collar 7 which is made from an elastic band. However, simply using a drag rope and a collar cannot positively control the movement of the dog in all directions. Further, when pulling the drag rope, the collar is forced to squeeze the dog's throat, causing the collar to pain the dog.

SUMMARY OF THE INVENTION

It is one object of the present invention to provide a dog harness which can be conveniently fastened to the dog's body. It is another object of the present invention to provide a dog harness which can be conveniently adjusted subject to fit the size of the dog. It is still another object of the present invention to provide a dog harness which enables the user to well manipulate the movement of the dog. It is still another object of the present invention to provide a dog harness which is comfortable in use. To achieve these objects, there is provided a dog harness comprised of a collar mounted on a dog's neck, the collar having a metal ring secured thereto; a girth passing around the dog's body, the girth having a first end mounted with a hook hooked on the metal ring at the collar and a second end inserted through the metal ring at the collar; a retainer moved on the girth between the second end of the girth and the metal ring at the collar and secured at the desired location, said retainer comprising a button holder, the button holder having a transverse through hole through which the girth passes, a compression spring mounted in said button holder, and a press button mounted in the button holder and supported on the compression spring, the press button having a transverse through hole through which the girth passes, the compression spring imparting an outward pressure to the press button, causing the girth to be jammed in the transverse through hole on the press button and the transverse through hole on the button holder; a drag rope having a first end connected to the second end of the girth and a second end terminating in a handhold; and a belt connected between the collar and the girth and retained between the two front legs of the dog, the belt having a loop at a first end thereof through which the girth passes, a belt buckle on the middle, and a second end passing through the collar and secured to the belt buckle.

DETAILED DESCRIPTION OF THE PREFERRED EMBODIMENT

Figure 1:
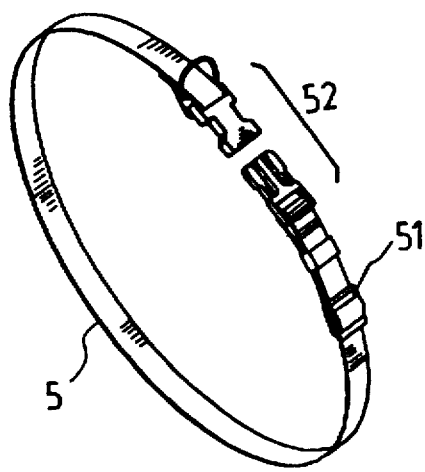
FIG. 1 is a perspective view of a collar for dog according to the prior art.
Figure 2:
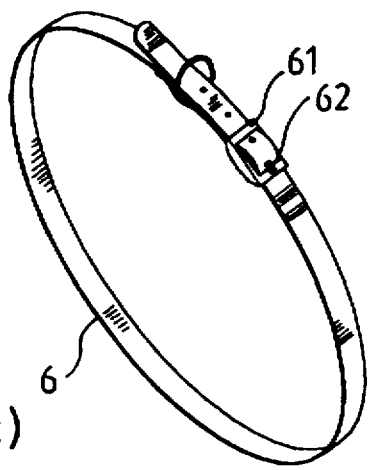
FIG. 2 is a perspective view of another structure of collar for dog according to the prior art.
Figure 3:
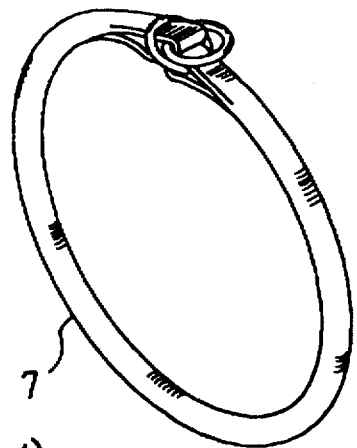
FIG. 3 is a perspective view of still another structure of collar for dog according to the prior art.
Figure 4:
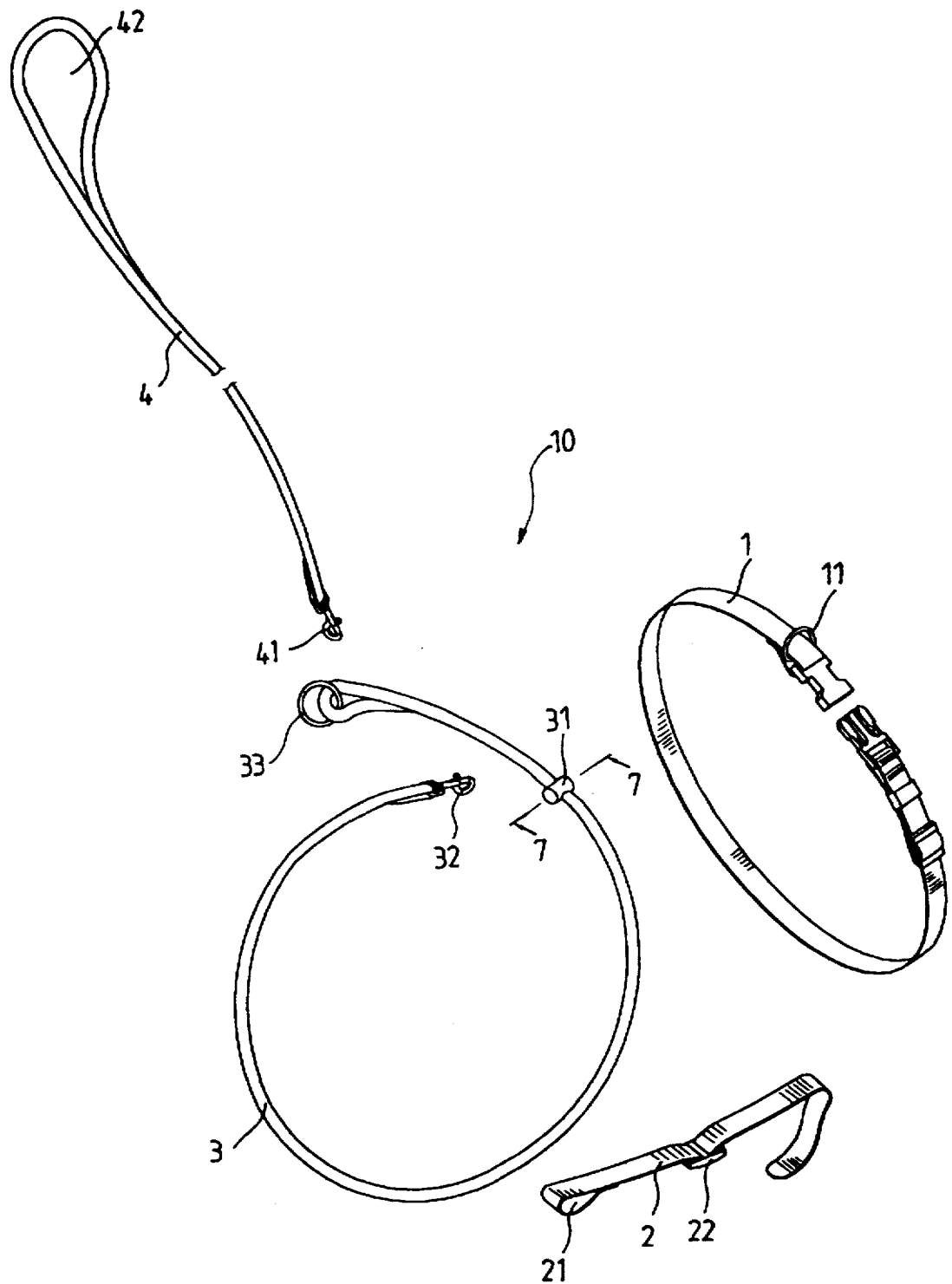
FIG. 4 is an exploded view of a dog harness according to a first embodiment of the present invention.
Figure 5:
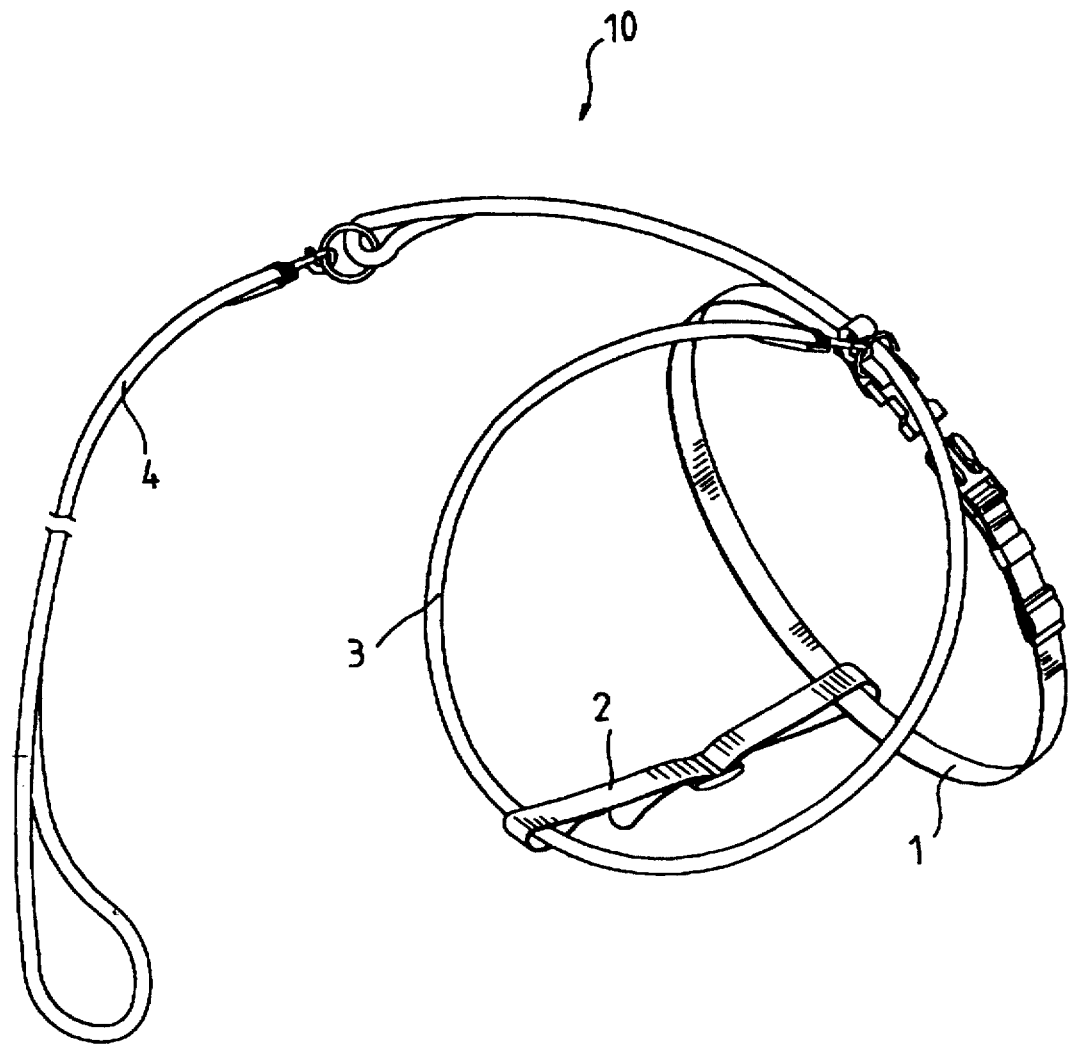
FIG. 5 is a perspective assembly view of the dog harness shown in FIG. 4.

Referring to FIGS. 4 and 5, a dog harness 10 is shown comprised of a collar 1, a belt 2, a girth 3, and a drag rope 4. The collar 1 can have any of a variety of forms, and is designed for securing to the neck of the dog. Further, a metal ring 11 is provided at the collar 1. The drag rope 4 has a swivel hook 41 at one end, and a handhold 42 at an opposite end. The belt 2 has a loop 21 at one end through which the girth 3 passes. The other end of the belt 2 is inserted through the collar 1, then turned back and secured to a belt buckle 22 on the middle of the belt 2. The girth 3 is a cord member having a hook 32 at one end for hooking on the metal ring 11 at the collar 1, a metal ring 33 at an opposite end for coupling to the swivel hook 41 at the drag rope 4, and a retainer 31 adjustably moved between the hook 32 and the metal ring 33 and stopped at one side of the metal ring 11 at the collar 1.

Figure 7:
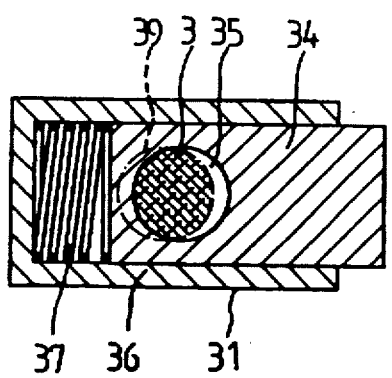
FIG. 7 is a sectional view taken along line 7—7 of FIG. 4.
Figure 8:
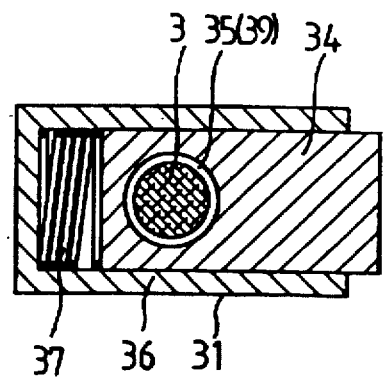
FIG. 8 is similar to FIG. 7 but showing the press button depressed, the compression spring compressed, the through holes concentrically aligned.

Referring to FIGS. 7 and 8 and FIGS. 4 and 5 again, the retainer 31 comprises a button holder 36, a compression spring 37 mounted in the button holder 36, and a press button 34 mounted in the button holder 36 and supported on the compression spring 37. The button holder 36 has a transverse through hole 39 through which the girth 3 passes. The press button 34 has a transverse through hole 35 through which the girth 3 passes. When the press button 34 is depressed, the transverse through hole 35 on the press button 34 and the transverse through hole 39 on the button holder 36 are concentrically aligned, enabling the retainer 31 to be moved on the girth 3 (see FIG. 8). When the hand is released from the press button 34, the press button 34 is automatically forced outwards by the compression spring 37, thereby causing the girth 3 to be jammed in the press button 34 and the button holder 31.

Figure 9:
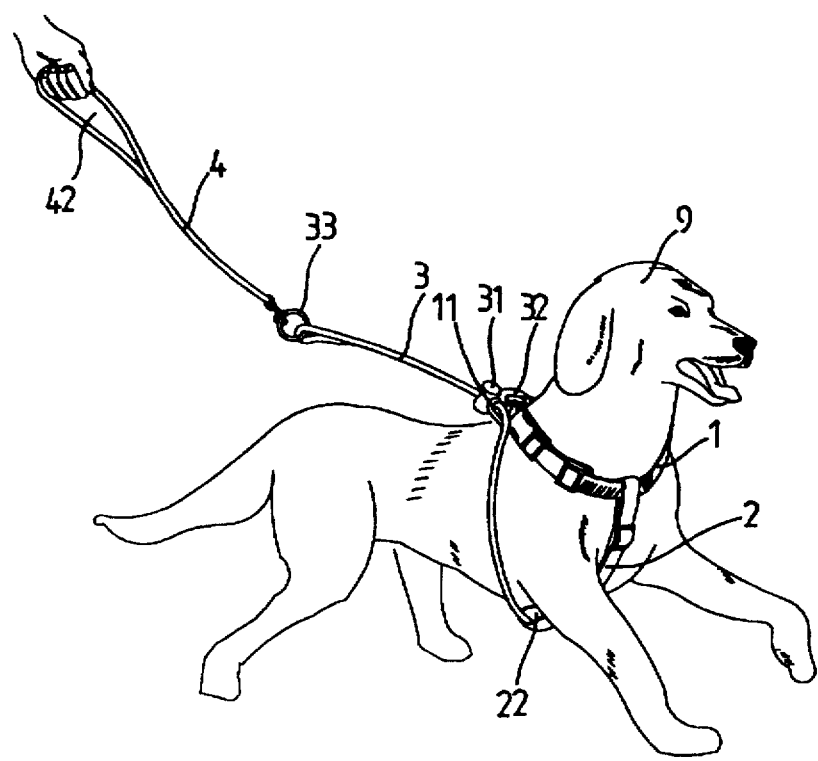
FIG. 9 is an applied view of the first embodiment of the present invention, showing the dog harness installed.
Figure 10:
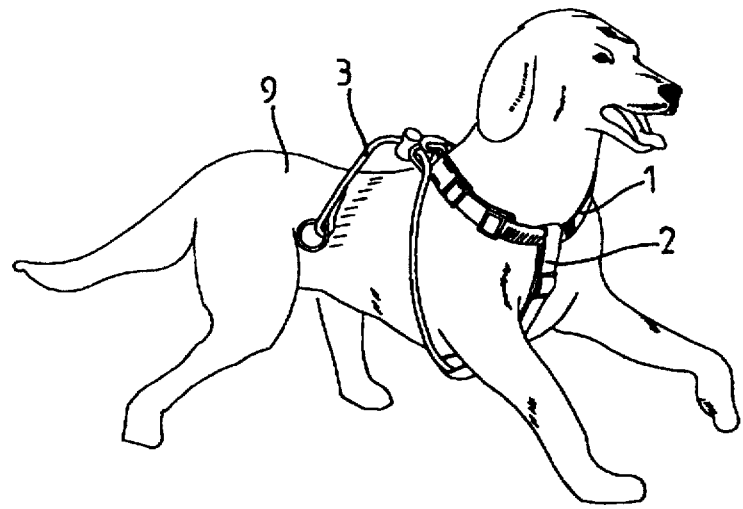
FIG. 10 is similar to FIG. 9 but showing the drag rope removed.

Referring to FIGS. 9 and 10, when in use, the collar 1 is fastened to the neck of the dog 9, the girth 3 is inserted through the metal ring 11 at the collar 1 and wound round the body of the dog 9 with the hook 32 hooked on the metal ring 11 at the collar 1, the belt 2 is connected between the collar 1 and the girth 3 and retained between the two front legs of the dog 9, and then the swivel hook 41 of the drag rope 4 is fastened to the metal ring 33 at the girth 3. Further, the drag rope 4 may be disconnected from the girth 3 to let dog 9 run freely.

Figure 6:
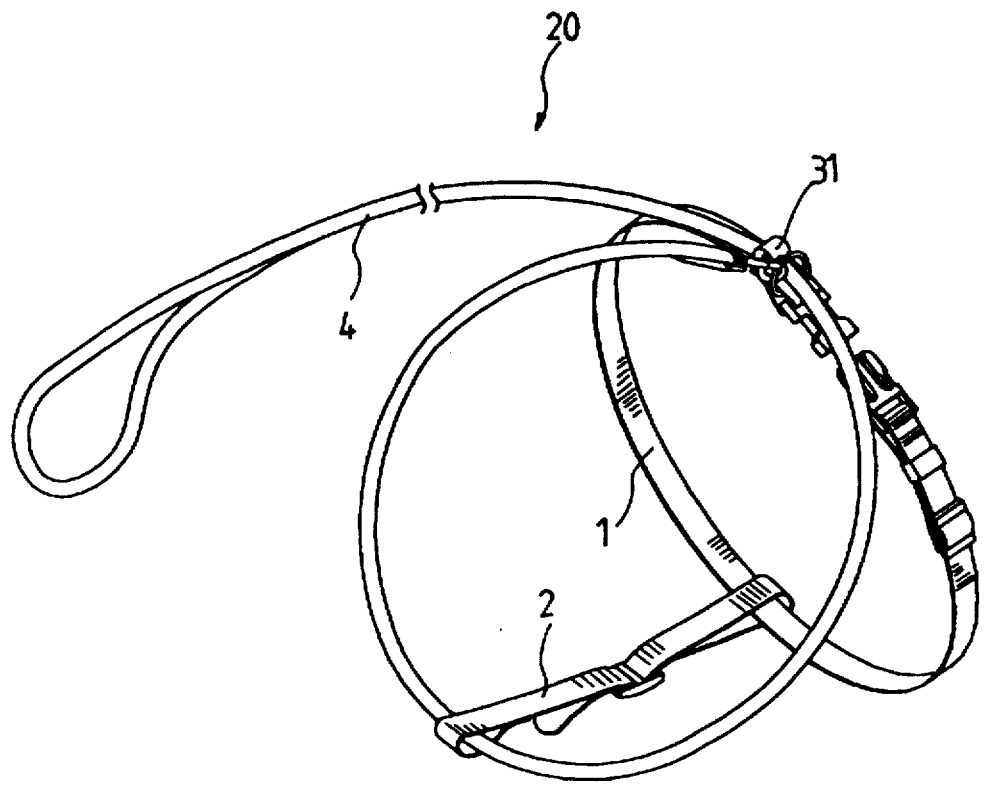
FIG. 6 is a perspective assembly view of a dog harness according a second embodiment of the present invention.
Figure 11:
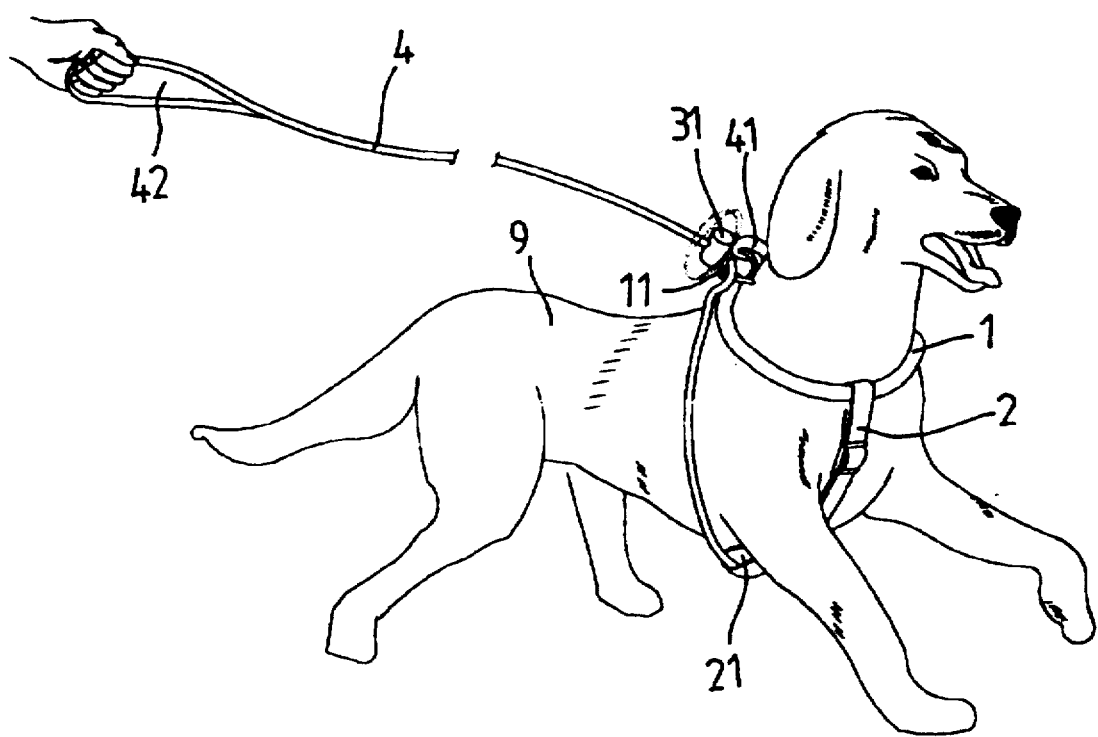
FIG. 11 is an applied view of the second embodiment of the present invention, showing the dog harness installed.

Referring to FIGS. 6 and 11, as an alternate form of the present invention, the aforesaid girth 3 is eliminated; the drag rope 4 has a certain length, and is inserted through the metal ring 11 at the collar 1 and the loop 21 at the belt 2 and passed around the body of the dog 9.

What the invention claimed is:

1. A dog harness comprising:

a collar mounted on a dog's neck, said collar having a metal ring secured thereto;

a girth passing around the dog's body, said girth having a first end mounted with a hook hooked on the metal ring at said collar and a second end inserted through the metal ring at said collar;

a retainer moved on said girth between the second end of said girth and the metal ring at said collar and secured at a desired location, said retainer comprising a button holder, said button holder having a transverse through hole through which said girth passes, a compression spring mounted in said button holder, and a press button mounted in said button holder and supported on said compression spring, said press button having a transverse through hole through which said girth passes, said compression spring imparting an outward pressure to said press button, causing said girth to be jammed in the transverse through hole on said press button and the transverse through hole on said button holder;

a drag rope having a first end connected to the second end of said girth and a second end terminating in a handhold; and a belt connected between said collar and said girth and retained between the two front legs of the dog, said belt having a loop at a first end thereof through which said girth passes, a belt buckle on the middle, and a second end passing through said collar and secured to said belt buckle.

2. The dog harness of claim 1, wherein said girth has a metal ring at the second end thereof; said drag rope has a swivel hook at the first end thereof fastened to the metal ring at the second end of said girth.

3. The dog harness of claim 1, wherein the second end of said girth is integral with the first end of said drag rope.

* * * * *